Figure 1:
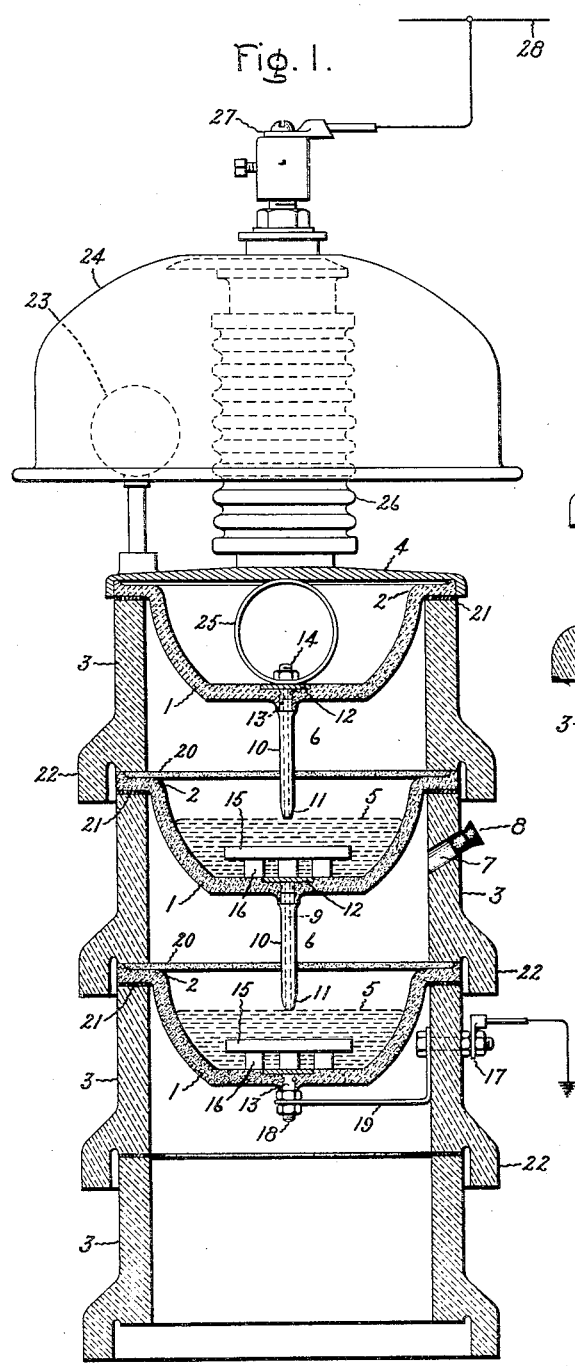

E. E. F. CREIGHTON AND F. R. SHAVOR.
PROTECTIVE DEVICE.
APPLICATION FILED JAN. 10, 1918.

1,394,971.

Patented Oct. 25, 1921.

Inventors:
Frederick R. Shavor,
Elmer E. F. Creighton,
by *Their Attorney*

UNITED STATES PATENT OFFICE.

ELMER E. F. CREIGHTON AND FREDERICK R. SHAVOR, OF SCHENECTADY, NEW YORK, ASSIGNORS TO GENERAL ELECTRIC COMPANY, A CORPORATION OF NEW YORK.

PROTECTIVE DEVICE.

1,394,971.   Specification of Letters Patent.   Patented Oct. 25, 1921.

Application filed January 10, 1918. Serial No. 211,113.

*To all whom it may concern:*

Be it known that we, ELMER E. F. CREIGHTON and FREDERICK R. SHAVOR, citizens of the United States, residing at Schenectady, county of Schenectady, State of New York, have invented certain new and useful Improvements in Protective Devices, of which the following is a specification.

Our invention relates to protective devices and particularly to devices for protecting a system of distribution from conditions of excess voltage and has for its object to provide a protective device of the electrolytic or liquid electrode type which is relatively cheap, reliable in its operation, operative to relieve a conductor of high potential charges with great rapidity and prevent the dynamic current from following and which is, in general, an improvement on similar devices heretofore known in the art.

Our novel and improved protective device comprises a plurality of cells containing a liquid electrode and a coöperating solid electrode which may be in surface engagement therewith, or in close proximity to the surface thereof, the electrodes comprising each cell being arranged to form a series circuit. In series with the circuit through the cells and to the conductor to be protected, a spark gap is connected, across which potentials above a predetermined amount discharge and are relieved from the conductor to be protected, by passage through the circuit of the cells. The passage of a discharge through the cells vaporizes the film of liquid adjacent the solid electrode of each cell causing a plurality of arcs to form in series between the solid electrodes and the surfaces of their corresponding liquid electrodes. The liquid electrodes are thereby displaced or otherwise moved out of engagement with their solid electrodes to lengthen the gaps and as arcs from a solid to a liquid are very unstable, these arcs so formed are extinguished with great rapidity to interrupt the circuit before the dynamic current can follow. The liquid electrode returning to its normal position again closes the series circuit through the cells preparatory to relieving the conductor from further charges.

The novel features which we believe to be characteristic of our invention will be definitely indicated in the claims appended hereto, while the features of construction and mode of operation will be understood by reference to the following description taken in connection with the accompanying drawings which show the preferred embodiments of our invention and in which—

Figure 2:
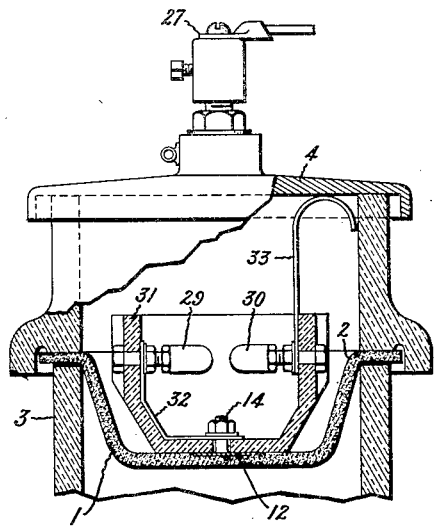
Figure 3:
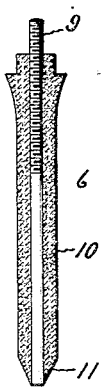

Figure 1 is a side elevation partly in section of a protective device embodying our invention; Fig. 2 is a view partly in section of a modified form of a portion of our protective device, and Fig. 3 is a detailed sectional view of a portion of our protective device shown in Fig. 1.

Our protective device, as shown in Fig. 1, comprises a plurality of dish-shaped members or receptacles 1 substantially circular in configuration, having lip or flange portions 2 by means of which the receptacles are supported or mounted one above the other to form a stack. The receptacles may be made of metal and protected on their lower sides with insulating material, but in the construction shown the receptacles are preferably made of insulating material and waterproofed either by glazing or as preferred, by impregnation with, for instance, a bituminous material. Between the receptacles 1, serving to separate the same, are spacing members 3 cylindrical in shape and of insulating material, these members engaging the flange portions 2 to support the receptacles and to form closed compartments or cell units between adjacent receptacles. In order to render these spacing members impervious to moisture, the members are waterproofed preferably by glazing both the inner and outer sides thereof.

Mounted upon the receptacle 1 at the top of the stack, or closing the cell unit at the top of the stack, is a metal cover or plate 4, having a turned over edge portion which extends below and protects the joint or junction between the cover and the top receptacle. The receptacles comprising each cell unit, except that at the top of the stack, serve as a containing means for a liquid electrode, such as an electrolyte 5 of high conductivity which may be of various compositions, but what we prefer to use is a strong solution of sodium carbonate or washing soda having a specific gravity of approximately 1.080 at 20° C. and a specific resistance of about 12 ohms at 22° C. per centimeter cube. An electrolyte of this character is cheap to make, does not give off objectional gases on electrolysis and does not corrode iron.

Coöperating with the liquid electrode or electrolyte 5 contained in the receptacles 1, we provide metallic or solid electrode members 6 which are removably or detachably secured to the receptacles 1 upon the lower side thereof, and depend therefrom into the receptacles below. The spacing members 3 supporting the receptacles containing electrolyte, are provided with openings 7, preferably slanted inwardly, through which the electrolyte 5 is added to the receptacles 1 until the level of the electrolyte is high enough to just bring the surface thereof into proper relation with the lower ends of the corresponding metallic electrodes 6. The metallic electrodes may be in surface engagement with their corresponding liquid electrodes or bodies of electrolyte 5 which engagement is maintained by capillary attraction. The openings 7 are normally maintained closed by stoppers 8.

The depending electrode members 6 comprise, as best shown in Fig. 3, metal rods 9 protected from the electrolyte 5 except at their end surfaces, by sleeves of insulating material 10, surrounding the rods and having beveled or pointed end portions 11, adjacent the electrolyte for the purpose to be hereinafter described. Means are also provided for electrically connecting the electrolyte 5 within each receptacle 1 or of each cell, with the rod 9 of the electrode members 6 for the adjacent cell or cell below, that is, electrical connections are provided between the electrode members 6 and the electrolyte 5 within the receptacles from which the electrodes depend, forming thereby a series circuit through the cells. These connecting means comprise preferably metal or conducting plates or plugs 12, carried in recesses at the bottom of the receptacles 1, preferably integrally related therewith and molded into or otherwise secured to each receptacle and thereby immersed or submerged in the electrolyte 5. In conductive relation with the metal plates 12 and integrally related to each receptacle, are metal inserts 13 adapted to coöperate with upper ends of rods 9 of the electrode members 6 to secure the electrodes to their corresponding receptacles. For this purpose, the rods 9 and inserts 13 are preferably screw threaded. The receptacle 1 forming the top of the stack, carries a modified form of conducting plate 12 having an integrally related post or bolt 14 extending upwardly from the bottom of its receptacle for a purpose to be specified.

Submerged or immersed in the electrolyte 5 of each receptacle and preferably removably positioned or separate therefrom, is a baffling or intercepting means comprising a plate 15 of insulating material, preferably porcelain, mounted on legs 16 which serve to support the plate 15 upon the bottom of the receptacles. The legs 16 are of such a height that the plates 15 are positioned within the electrolyte intermediate the bottom of the receptacles or the contact plates 12 and the surface of the electrolyte. The position of these plates or baffling members 15 relative to the surface of the electrolyte bears an important relation; the nearer these members 15 are to the surface of the electrolyte 5, the less the discharge rate through the cells. We have found, however, by experiments, that this distance, for best results, should be substantially $\frac{1}{4}$ of an inch. The members 15, furthermore, increase the breakdown voltage of each cell, serve to intercept the arcs formed between the electrodes 6 and the electrolyte 5, and deflect the electrolyte when such arcs occur.

In order to provide a means for connecting the series circuit through the cells, to ground or some other point, the spacing member 3 forming the bottom cell unit or supporting the receptacle 1 at the bottom of the stack, is provided with a horizontal opening through which a conducting member extends carrying a suitable terminal member 17 bolted or otherwise secured to the spacing member. The bottom receptacle contains no depending electrode member 6, but a bolt member 18 is threaded or otherwise detachably secured to the receptacle in engagement with the metal insert 13 and conducting plate 12 between which and the terminal member 17 is secured a conductor 19.

In order to effectively maintain the compartments between adjacent receptacles 1 or the cell units closed to prevent evaporation of electrolyte and effects of humidity, the junctions or joints between the flange portions 2 and spacing members 3 are made air tight, preferably by means of gaskets 20 and 21 of annular configuration impregnated with a bituminous material and located on the upper and lower sides respectively of the flanges 2 of each receptacle. The receptacles 1 have preferably a recessed portion in which gasket 20 is located which, together with gasket 21, forms an air and water tight joint. To further protect these joints from weather conditions such as rain and snow, the spacing members 3 are preferably provided with offset portions 22° extending over and below each joint.

In combination with the series circuit through the cells, a spark gap is provided, with means for connecting the gap in the series circuit and to the conductor to be protected. In the structure shown in Fig. 1 this spark gap comprises coöperating electrodes 23 and 24, carried by the cell stack and forming a part thereof. Electrode 23 is preferably spherical in configuration and is connected to the circuit through the cells by means of the cover plate 4 for the stack upon which it is mounted on the edge thereof and in conductive relation thereto. Connecting the cover plate 4 to the plate 12, carried by the receptacle at the top of the stack, is a contact member 25 preferably of flexible material, which is shown of circular configuration secured to the bolt 14 of the plate 12 and in spring-pressed engagement with the cover 4. The coöperating electrode 24 which is bell-shaped or in the shape of an umbrella is supported by the cover 4 and insulated therefrom by means of an insulating bushing 26 upon which the umbrella electrode 24 is pivotally mounted for rotatable movement and is positioned to extend over and partially inclose the spherical electrode 23 to form a spark gap between the electrode 23 to and the inner surface of the umbrella, which gap is thereby protected from the weather conditions such as rain and snow. This protected spark, which may be considered as a sphere gap, has, therefore, a constant arc-over voltage independent of weather conditions. The umbrella electrode 24 carries a terminal member 27 which is adapted to be connected to the conductor to be protected, shown for instance in Fig. 1 as the conductor 28.

In Fig. 2 we have shown a modified type of spark gap which may be substituted for the umbrella type of spark gap shown in Fig. 1. This gap is arranged to be carried in one of the units of the protective device instead of externally and comprises coöperating electrodes 29 and 30 carried within the receptacle 1 forming the top of the cell stack being adjustably mounted on opposite sides of an insulating support 31 secured to the bolt 14 of the receptacle. Electrode 29 is connected to the bolt 14 and to the conducting plate 12 of the receptacle and hence in the series circuit through the cells by means of a conducting member 32 carried by the support 31, while electrode 30 is connected to the cover 4 for the cell stack by means of a flexible conducting member 33 in spring-pressed engagement therewith. In this construction the line terminal 27 is connected directly to the cover 4. It will be observed that the spark gap between the electrodes 29 and 30 is likewise protected from the weather conditions and has thereby a constant arc-over voltage.

The operation of our protective device may be described as follows: To protect the conductor, for instance, the conductor 28, the spark gap in series with the circuit through the cells is so adjusted to relieve the conductor 28 from excess charges or potentials above a predetermined amount and the stack comprises a number of cells which depends upon the operating voltage of the conductor. When a potential occurs on the conductor 28 above that for which the spark gap is set, the potential is relieved from the conductor by discharging across the gap from the umbrella electrode 24 to the sphere electrode 23 or from electrode 30 to electrode 29, as the case may be, thence by means of the cover 4, conductor 25 or 33, to the conducting plate 12 of the receptacle at the top of the stack and thence following the conducting path through the cells from the rod 9 of the electrode 6 in the top receptacle through the surface of the electrolyte 5 within the adjacent receptacle or one below and in a similar manner through all the cells to the terminal member 17. Owing to the passage of the discharge through the rods 9 solid electrodes 6 and the electrolyte 5 in each cell, the electrolyte pushes away the electrolyte surrounding the rods 9 and forms a plurality of gaps in series across which arcs occur. The occurrence of the arcs further heats the electrolyte and vaporizes it and the arcs so formed impinge against the intercepting members 15 causing the electrolyte 5 in each receptacle to be splashed or otherwise displaced upwardly, thereby further lengthening the gaps to such an extent that the arcs are quickly extinguished. Due to the baffling or intercepting members 15 beneath the electrolyte of each cell, the arcs formed between the electrodes 6 and the electrolyte 5 are intercepted and prevented from penetrating the electrolyte to the conducting plates 12 at the bottom of the receptacles and at the same time the flat surfaces of the intercepting members 15 provide a means for throwing or deflecting the electrolyte away from electrodes 6 to the sides of the cell against the spacing members 3. The position of the intercepting members 15 relative to the surface of the electrolyte is important as the electrolyte must be thrown a sufficient distance to allow time enough for the arcs to be extinguished before the electrolyte returns to normal position and hence the discharge rate of the device controlled. The presence of the intercepting members 15 likewise reduces the quantity of electrolyte which must be moved to provide a sufficient distance between the electrode 6 and the electrolyte to cause the arcs to be extinguished.

Due to the fact that the electrolyte is projected upwardly, the insulating sleeves 10 for the rods 9 of the electrode members 6, have a pointed or beveled end portion 11 in order to offer as little retarding action as possible to the electrolyte and to assist in displacing the electrolyte away from the metal rod 9 or conducting portion of the electrode 6. As an arc formed between a solid and a liquid is very unstable, the action of the protective device is to quickly extinguish the plurality of arcs formed in series in the cells which action takes place with substantially a half cycle, whereupon the electrolyte returns to normal position ready for another discharge from the line conductor.

As the spacing members 3 and receptacles 1 are waterproofed there is no absorption of electrolyte and due to the fact that the receptacles are of insulating material and the electrodes 6 are likewise protected, there is no danger of the electrolyte splashing and causing the dynamic current to follow the discharge. Furthermore, due to the watertight and protected joints between the spacing members 3 and the receptacles, there is no danger of leakage of electrolyte or seepage of water into the cell compartments and no danger of evaporation of electrolyte due to changes of humidity of the atmosphere. Again the spark gap in series being of a protected type there is no danger of the gap discharging under varying conditions of weather.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. In a device of the class described, a container, a conducting fluid within the container, an electrode in series circuit relation with said fluid and means operative upon a discharge through said circuit and the occurrence of an arc between said electrode and fluid for directing said fluid away from said electrode.

2. In a device of the class described, a container, an electrolyte within said container, a stationary electrode normally in contact with said electrolyte and means operative upon a discharge through and the formation of an arc between said electrode and electrolyte for causing said electrolyte under the influence of the pressure created by said discharge to flow away from said electrode.

3. In a protective device, a container, spaced conducting members in series circuit relation, an electrolyte interposed in the circuit between said conducting members and insulating means interposed between said conducting members and operative upon a discharge through said circuit and the formation of an arc between one of said conducting members and said electrolyte to cause said electrolyte to move away from said conducting members.

4. In a protective device, the combination with a plurality of receptacles containing a liquid electrolyte, means for electrically connecting the electrolyte in said receptacles in a series circuit including an electrode member within the electrolyte in one receptacle which extends into conducting relation with the electrolyte of an adjacent receptacle, and means forming the spark gap in series with said circuit.

5. In a protective device, the combination with a plurality of receptacles containing an electrolyte, means for electrically connecting the electrolyte in said receptacles in a series circuit including an electrode member immersed in the electrolyte of one receptacle which extends into conducting engagement with the surface of the electrolyte in an adjacent receptacle, and means forming a spark gap in series with said circuit.

6. In a protective device, the combination with a plurality of receptacles containing an electrolyte, means for electrically connecting said electrolyte in a series circuit, including electrode members in conducting relation with said electrolyte, baffling means within said receptacles adjacent said electrode members, and means forming a spark gap in said series circuit.

7. In a protective device, the combination with a plurality of receptacles containing an electrolyte, electrode members in conducting relation with the electrolyte in each receptacle, means electrically connecting the electrolyte in each receptacle with the electrode of the next adjacent receptacle to form a series circuit, baffling means removably positioned in each receptacle beneath each electrode, and means forming a spark gap in said series circuit.

8. In a protective device, the combination with a plurality of receptacles containing an electrolyte, electrode members in conducting relation with the electrolyte in each receptacle, means for connecting said electrodes and electrolyte in a series circuit, baffling means removably positioned in each receptacle and immersed in said electrolyte therein, and means forming a spark gap in series with said circuit.

9. In a protective device, the combination with a plurality of receptacles of insulating material, an electrolyte partially filling each receptacle, a conducting plate carried by each receptacle and immersed in said electrolyte, electrodes in conducting relation with the electrolyte in said receptacles, conducting means between the conducting plate of one receptacle and the electrode of an adjacent receptacle whereby said electrolyte and electrodes complete a normally closed conducting path, insulating means within each receptacle intermediate said electrodes and said conducting plates, and means forming a spark gap in series with said conducting path.

10. In a protective device, the combination with a plurality of receptacles mounted one above the other and containing an electrolyte, spacing means between said receptacles, electrode members depending from said receptacles in conducting relation with the electrolyte in said receptacle beneath, means for electrically connecting said electrodes with the electrolyte in the receptacle from which said electrodes depend to form a closed conducting path, and means forming a spark gap in series with said conducting path.

11. In a protective device, the combination with a plurality of receptacles mounted one above the other and containing an electrolyte, spacing means between said receptacles forming therewith closed compartments, electrode members detachably secured to said receptacles and extending from the bottom thereof within said compartments in conducting relation with the electrolyte in the receptacle beneath, conducting means between each electrode and the electrolyte within the receptacle to which it is secured to form a closed conducting path, and means forming a spark gap in series with said path.

12. In a protective device, the combination with a plurality of receptacles mounted one above the other to form a stack, electrolyte within said receptacles, spacing means between said receptacles forming therewith closed compartments, electrode members maintained in conductive relation with the electrolyte in said receptacles and extending within said compartments in conducting relation with the surface of the electrolyte in the receptacles below to form a normally closed circuit, coöperating arcing electrodes carried by said stack and spaced apart to form a spark gap, and means connecting said gap in series with said circuit.

13. In a protective device, the combination with a plurality of receptacles of insulating material, mounted one above the other, electrolyte partially filling said receptacles, conducting plates carried by said receptacles and submerged in said electrolyte, spacing members of insulating material separating said receptacles, electrodes removably secured to said receptacles in conductive relation with said plates and extending in conductive relation with the electrolyte in the receptacles beneath to form a closed series circuit, insulating sleeves including said electrodes having beveled end portions adjacent the electrolyte surface, separate insulating baffling plates submerged in the electrolyte in said receptacles intermediate said conducting plates and said electrodes, and means forming a spark gap in said series circuit.

14. In a protective device, the combination with a plurality of receptacles of insulating material electrolyte partially filling said receptacles, conducting plate integrally related to said receptacles and submerged in said electrolyte, conducting means between the conducting plate of one receptacle and the surface of the electrolyte in an adjacent receptacle to form a series circuit, insulating means in said receptacles between said conducting plates and the surface of the electrolyte, and means forming a spark gap in said series circuit.

15. In a protective device, the combination with a plurality of electrolytic cells mounted in vertical alinement, each cell comprising an electrolyte electrode and a coöperating metal electrode in conducting relation with the surface thereof, conducting means between the electrolyte of one cell and the metal electrode of an adjacent cell to form a normally closed conducting path, means operative in response to the arcs formed between said metal electrodes and electrolyte upon the occurrence of a discharge over said path for deflecting the electrolyte from said electrodes and interrupting the arcs, and means forming a spark gap in series with said conducting path.

16. In a protective device, the combination with a plurality of receptacles containing electrolyte mounted one above the other to form a stack, spacing members separating said receptacles, electrode members maintained in conductive relation with the electrolyte in each of said receptacles depending from each receptacle in conductive relation with the electrolyte in the receptacle beneath to form a series circuit, an empty receptacle at the top of said stack, a conducting cover secured to said empty receptacle, an electrode within said receptacle in conductive relation with said series circuit, a coöperating electrode within said receptacle spaced away from said first mentioned electrode to form a spark gap and in conductive relation with said cover, and a connection between said cover and the conductor to be protected.

17. In a protective device, the combination with a plurality of cells mounted in stack formation, each cell comprising coöperating liquid and solid electrodes in conducting relation, means connecting the liquid electrode of one cell to the solid electrode of the cell beneath to form a normally closed conducting path, means responsive to the passage of a discharge between said coöperating electrodes for displacing said liquid electrodes to form a plurality of gaps in series, and means forming an additional gap in series with said path.

18. The combination with an electrical conductor, of means for relieving said conductor of high potential charges comprising, a plurality of cells arranged in a vertical stack, each cell containing an electrolyte, a detachable electrode in conducting relation with said electrolyte, means for connecting said cells in a series circuit, and means carried by said stack, forming a spark gap, said means being connected to said conductor and said cells.

19. The combination with an electrical conductor, of means for relieving said conductor from high potential charges comprising a plurality of receptacles containing an electrolyte mounted one above the other, coöperating electrodes carried by said receptacles in conductive relation with the electrolyte therein and in conducting relation with said electrolyte in the receptacle beneath to form a series circuit, baffling means immersed in said electrolyte beneath said electrodes, an empty receptacle at the top of said stack, coöperating electrodes carried by said empty receptacle and separated to form a spark gap, a conducting cover for said empty receptacle connected to said conductor, means connecting one of said electrodes to said cover, and means connecting the other of said electrodes to the electrode carried by said empty receptacle.

20. A protective device comprising a plurality of receptacles mounted one above the other, spacing members between said receptacles forming therewith closed compartments, means coöperating with said spacing members and said receptacles for rendering said compartments air tight, coöperating arcing electrodes carried by the top receptacle and spaced apart to form a spark gap, electrodes depending from said receptacles, means connecting one of said arcing electrodes to the electrode depending from said top receptacle, and electrolyte within the remainder of said receptacles in conducting relation with said depending electrodes to form a normally closed conducting path, means responsive to the passage of a discharge between said depending electrodes and the surface of said electrolyte to deflect said electrolyte and interrupt the circuit.

21. In an electrolytic cell a receptacle of insulating material, a supporting member therefor, a conducting plate at the bottom of said receptacle integrally related thereto, an electrode member detachably secured to said receptacle and depending therefrom, comprising a metal rod, an insulating sleeve surrounding said rod beveled at one end, an electrolyte within said receptacle in contact with said conducting plate, and a separate baffling member immersed in said electrolyte intermediate said conducting plate and the surface of the electrolyte.

22. An electrolytic cell comprising a receptacle of insulating material, insulating means supporting said member, an electrolyte partially filling said receptacle, a conducting plate immersed within said electrolyte and forming an integral part of said receptacle, an electrode detachably secured to said receptacle and depending therefrom, means forming a connection between said electrode and said plate, an insulating sleeve inclosing said electrode terminating in a pointed position, and a separate baffling member immersed in said electrolyte intermediate said conducting plate and the surface of the electrolyte.

23. In combination with an electrical conductor, coöperating electrodes spaced apart to form a spark gap, a connection between one of said electrodes and said conductor, a normally closed path to ground connected to the other of said electrodes including a plurality of receptacles containing electrolyte, electrodes coöperating with the electrolyte of said receptacles to form therewith a series circuit, said electrolyte being displaced in response to a discharge over said circuit to form a plurality of arcs in series, and means for intercepting the arcs formed between the electrolyte and said electrodes.

24. In combination with an electrical conductor, means for relieving said conductor of high potential discharges comprising a plurality of cells, metal electrodes for said cells, and coöperating liquid electrodes in conductive relation therewith to form a series circuit, a spark gap between said cells and said conductor, said liquid electrodes being displaced in response to a discharge over said gap to break engagement with said metal electrodes and interrupt said circuit, said liquid electrodes automatically reclosing said series circuit when the arcs formed are interrupted.

In witness whereof, we have hereunto set our hands this 8th day of January, 1918.

ELMER E. F. CREIGHTON.
FREDERICK R. SHAVOR.